(12) United States Patent
Sakamoto et al.

(10) Patent No.: US 6,823,290 B2
(45) Date of Patent: Nov. 23, 2004

(54) METHOD AND SYSTEM FOR INSPECTING THERMAL EQUIPMENT

(75) Inventors: Tsuneo Sakamoto, Burlington (CA); Nobuyuki Ishizaki, Brantford (CA)

(73) Assignee: Miura Co., Ltd., Matsuyama (JP)

( * ) Notice: Subject to any disclaimer, the term of this patent is extended or adjusted under 35 U.S.C. 154(b) by 57 days.

(21) Appl. No.: 10/055,341

(22) Filed: Jan. 25, 2002

(65) Prior Publication Data

US 2002/0099522 A1 Jul. 25, 2002

(30) Foreign Application Priority Data

Jan. 25, 2001 (JP) ........................... 2001-017365

(51) Int. Cl.[7] .................. G06F 11/00; G06F 15/46; G01B 7/00
(52) U.S. Cl. .................. 702/188; 700/286; 702/187; 725/111
(58) Field of Search ................. 702/62, 122, 187, 702/188; 725/111; 340/3.1–3.9; 700/9, 10, 286; 705/7, 8, 9, 11

(56) References Cited

U.S. PATENT DOCUMENTS 3,855,456 A * 12/1974 Summers et al. ........... 700/286
5,321,629 A * 6/1994 Shirata et al. .............. 702/187
6,308,328 B1 * 10/2001 Bowcutt et al. ............ 725/111
2002/0038200 A1 * 3/2002 Shimizu et al. ............ 702/188

OTHER PUBLICATIONS

Spira et al., "Method of providing maintenance services", Pub. No.: US 2002/0035495 A1, PubDate: Mar. 21, 2002, Non–provisional of provisional application No. 60/190,170, field on Mar. 17, 2000.*

* cited by examiner

Primary Examiner—John Barlow
Assistant Examiner—John Le
(74) Attorney, Agent, or Firm—Birch, Stewart, Kolasch & Birch, LLP

(57) ABSTRACT

A system for inspecting thermal equipment includes a communication line for connecting a facility site and a management center to each other. At the facility site, an operating state information collecting device collects information related to operating states of the thermal equipment. An information processing device fetches the information via the communication line and executes creation of report data for recording related to inspection data of the thermal equipment and delivers the created report data to the facility site. A center-side modem is interposed between the information processing device and the communication line. An output device provided at the facility site outputs a report based on the delivered report data. The report data is stored in a data storage device at each time of creation of the report data. Thus, the system inspecting thermal equipment allows for a reduction in labor.

16 Claims, 6 Drawing Sheets

F I G. 2
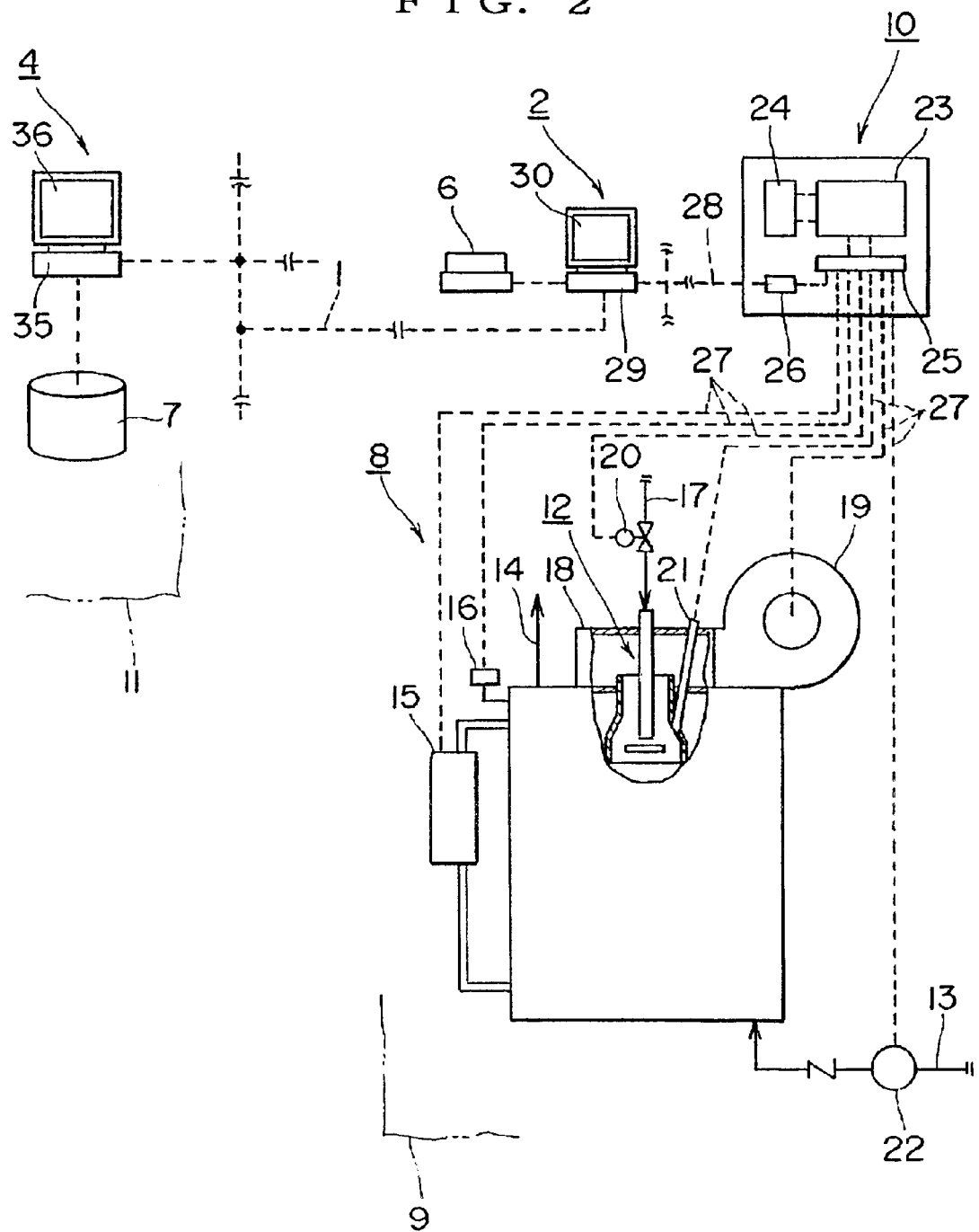

METHOD AND SYSTEM FOR INSPECTING THERMAL EQUIPMENT

BACKGROUND OF THE INVENTION

The present invention relates to a method and system for inspecting thermal equipment located at a facility site which is under a specified contract for the thermal equipment.

Thermal equipment, for example, boilers are under a legal obligation of being controlled to their normal state and maintained in safety on business proprietors' own responsibility. Therefore, it has become a practice for proprietors to perform periodical autonomous inspections (examinations) and maintain records of the periodical autonomous inspections in the form of daily reports, monthly reports, etc. Records or checks to be described in the daily reports, monthly reports, etc. are proofs that certify the boiler's having been normally operated/managed at the time when the periodical autonomous inspection was performed. The daily reports, monthly reports, etc. are preserved with those proofs described.

For persons in charge of equipment or boiler operators at a facility site where a boiler is provided, it has become routine work to record operating states, such as consumed fuel quantity, operating pressure, exhaust gas temperature, feed water temperature, electrical conductivity and feed water hardness, in daily reports periodically, normally two or three times (or every time) a day, while recording abnormalities (e.g., alarms) that have occurred as well with their time of occurrence, contents and the like in the daily reports, and to preserve and manage the daily reports. It has also been a routine to monthly rearrange information data as to the above various types of operating states in the form of monthly reports by totaling or averaging those data. It is noted that those rearranged data of monthly reports are used also for control of boiler tendencies, for investigations of causes in the event of accidents or as disclosure materials to examiners on inspections by third parties.

Under these circumstances, the persons in charge of equipment or boiler operators are required to periodically record operating states or the like in the daily reports, which would be quite a heavy burden as it is on an every-day basis. Also, the work of totaling or averaging the data in the preparation of monthly reports has also been quite laborious.

The present invention having been accomplished in view of the above circumstances, an object of the present invention is to provide a method and system for inspecting thermal equipment which allows a reduction of labor.

SUMMARY OF THE INVENTION

In order to achieve the above object, in a first aspect of the present invention, there is provided a method for inspecting thermal equipment, comprising the steps of: fetching information related to operating state of thermal equipment via a communication line into an information processing device provided at a management center connected via the communication line to a facility site which is equipped with the thermal equipment and which is under a specified contract for the thermal equipment; making the information processing device execute creation of report data for use of inspection recording related to an inspection of the thermal equipment as well as delivery of the created report data to the facility site; and outputting from an output device a report based on the report data delivered from the information processing device at the facility site.

In a second aspect, the invention provides a method for inspecting thermal equipment as described in the first aspect, wherein the information related to operating state of the thermal equipment is fetched into the information processing device at a specified time point.

In a third aspect, the invention provides a method for inspecting thermal equipment as described in the first aspect, wherein the information related to operating state of the thermal equipment is fetched into the information processing device at a specified time interval.

In a fourth aspect, the invention provides a method for inspecting thermal equipment as described in the first or third aspect, wherein in event of occurrence of an abnormality of the thermal equipment, abnormality information on the thermal equipment is fetched into the information processing device, and the fetched abnormality information is included in the report data.

In a fifth aspect, the invention provides a method for inspecting thermal equipment as described in the first or fourth aspect, wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

In order to achieve the above object, in a sixth aspect of the present invention, there is provided a system for inspecting thermal equipment to be built between a facility site which is equipped with thermal equipment and which is under a specified contract for the thermal equipment, and a management center which serves for maintenance and management of the thermal equipment, the system comprising: a communication line for connecting the facility site and the management center to each other; an operating-state information collecting device provided at the facility site and serving for collecting information related to operating state of the thermal equipment; a facility-side modem interposed between the operating-state information collecting device and the communication line; an information processing device which is provided at the management center and which fetches the information related to operating state of the thermal equipment via the communication line and further which executes creation of report data for use of inspection recording related to an inspection of the thermal equipment as well as delivery of the created report data to the facility site; a center-side modem interposed between the information processing device and the communication line; and an output device which is provided at the facility site and which serves for outputting a report based on the delivered report data.

In a seventh aspect, the invention provides a system for inspecting thermal equipment as described in the sixth aspect, wherein in event of occurrence of an abnormality of the thermal equipment, the information processing device is capable of fetching abnormality information on the thermal equipment and making the fetched abnormality information included in the report data.

In an eighth aspect, the invention provides a system for inspecting thermal equipment as described in the sixth or seventh aspect, wherein the system further comprises a data storage device for storing therein the report data at each time of creation of the report data, and wherein the information processing device is capable of executing creation of total report data for a specified period at which the report data stored in the data storage device is to be totaled as well as delivery of the created total report data to the facility site, while at the facility site, the output device is capable of outputting a total report of the specified period based on the total report data delivered from the information processing device.

According to the first aspect of the present invention, first of all, information related to operating state of the thermal equipment is fetched into the information processing device of the management center via the communication line. Next, creation of report data for use of inspection recording related to the inspection of the thermal equipment as well as delivery of the created report data to the facility site are executed by the information processing device. Subsequently, at the facility site, a report based on the report data delivered from the information processing device of the management center is outputted from the output device.

With the adoption of the method for inspecting thermal equipment according to the present invention, a report related to the inspection of thermal equipment can automatically be prepared as shown above.

According to the second aspect of the invention, information related to operating state of the thermal equipment is fetched into the information processing device when the specified time has come. As a result of this, information fetching can be achieved more accurately than persons do.

According to the third aspect of the invention, information related to operating state of the thermal equipment is fetched into the information processing device at a specified time interval. As a result of this, information fetching can be achieved more accurately than persons do.

According to the fourth aspect of the invention, in event of occurrence of an abnormality of the thermal equipment, abnormality information is fetched into the information processing device. Then, the fetched abnormality information is included in the report data. As a result of this, abnormality information is additionally described in the automatically prepared report related to the inspection of the thermal equipment.

According to the fifth aspect of the invention, report data is stored in the data storage device at each time of creation of the report data. Also, by the information processing device, stored data are totaled, and the creation of total report data for a specified period as well as the delivery of the created total report data to the facility site are executed. Then, at the facility site, a total report of the specified period based on the total report data delivered from the information processing device is outputted from the output device.

With the adoption of the method for inspecting thermal equipment according to the present invention, a total report of a specified period related to the inspection of thermal equipment can automatically be prepared as shown above.

According to the sixth aspect of the present invention, there can be provided a system for inspecting thermal equipment to be built between a facility site which is equipped with thermal equipment and a management center which serves for maintenance and management of the thermal equipment. The facility site is assumed to be under a specified contract for the thermal equipment. The facility site is equipped with an operating-state information collecting device, a facility-side modem and an output device. Also, the management center is equipped with an information processing device and a center-side modem. Further, the facility site and the management center are connected to each other by a communication line.

More specifically, the operating-state information collecting device collects information related to operating state of the thermal equipment, the facility-side modem is interposed between the operating-state information collecting device and the communication line, and serves for enabling communications with the facility-site side. Also, the information processing device fetches the information collected by the operating-state information collecting device, and executes the creation of report data as well as the delivery of the created report data to the facility site. The center-side modem is interposed between the information processing device and the communication line, and serves for enabling communications with the facility-site side. The output device serves for outputting a report based on the delivered report data.

Accordingly, information related to operating state of the thermal equipment is fetched into the information processing device of the management center via the communication line. Also, the creation of report data for use of inspection recording related to the inspection of the thermal equipment as well as the delivery of the created report data to the facility site are executed by the information processing device. Further, at the facility site, a report based on the report data delivered from the information processing device of the management center is outputted from the output device. As shown above, a report related to the inspection of thermal equipment is automatically prepared.

According to the seventh aspect of the invention, in event of occurrence of an abnormality of the thermal equipment, the information processing device can fetch abnormality information on the thermal equipment and make the fetched abnormality information included in report data. As a result of this, abnormality information is additionally described in the automatically prepared report related to the inspection of the thermal equipment.

According to the eighth aspect of the invention, the management center is further equipped with a data storage device. The data storage device stores therein report data created by the information processing device. Also, the information processing device provided at the management center executes creation of total report data for a specified period at which the report data stored in the data storage device is to be totaled as well as delivery of the created total report data to the facility site. Further, the output device outputs a total report of the specified period based on the total report data delivered from the information processing device.

Accordingly, a total report of a specified period related to the inspection of the thermal equipment is automatically prepared.

BRIEF DESCRIPTION OF THE DRAWINGS

FIG. 2 is a configurational diagram showing one embodiment of the system for inspecting thermal equipment according to the invention;

DETAILED DESCRIPTION OF THE PREFERRED EMBODIMENTS

Hereinbelow, embodiments of the present invention are described with reference to the accompanying drawings.

Figure 1:
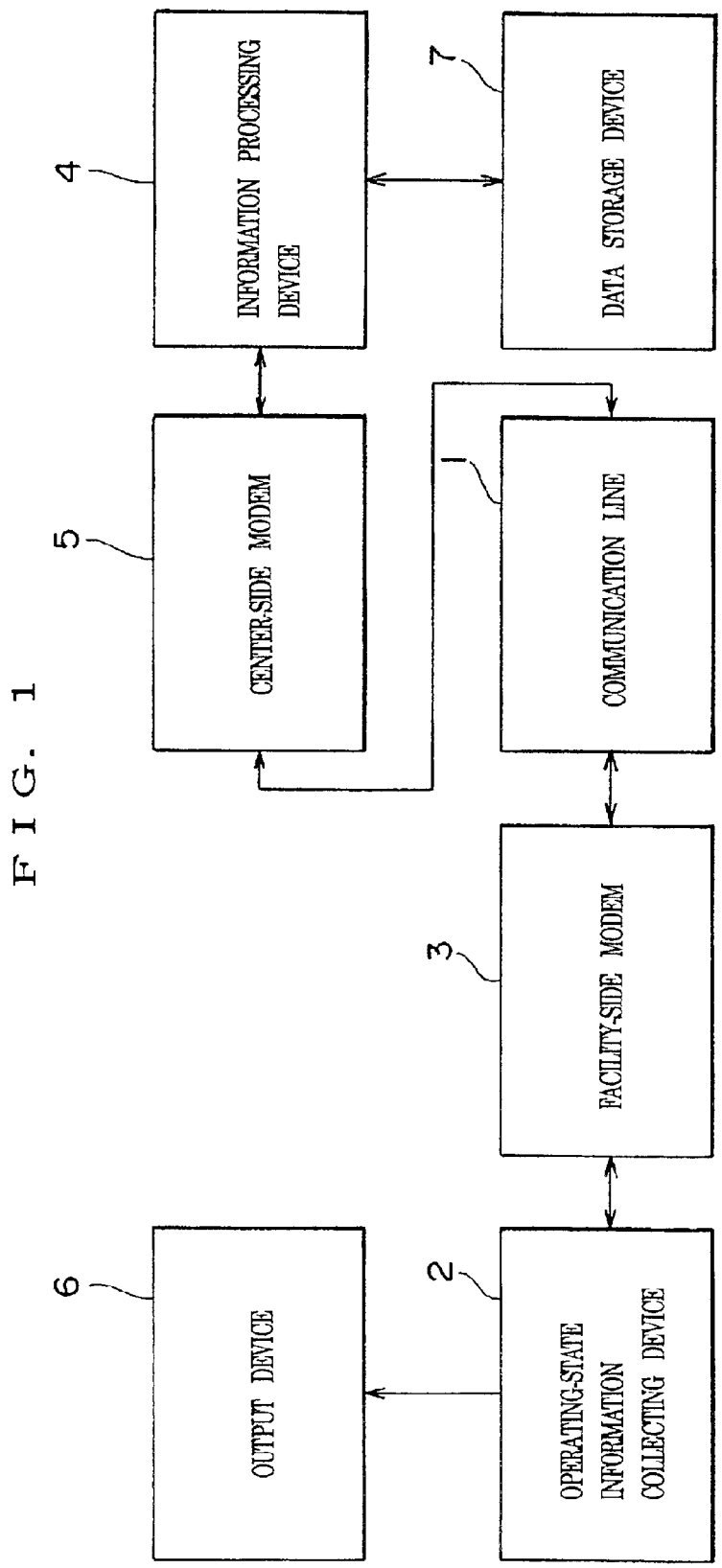
FIG. 1 is a view showing basic construction of an inspection system for thermal equipment according to the present invention.
Figure 3:
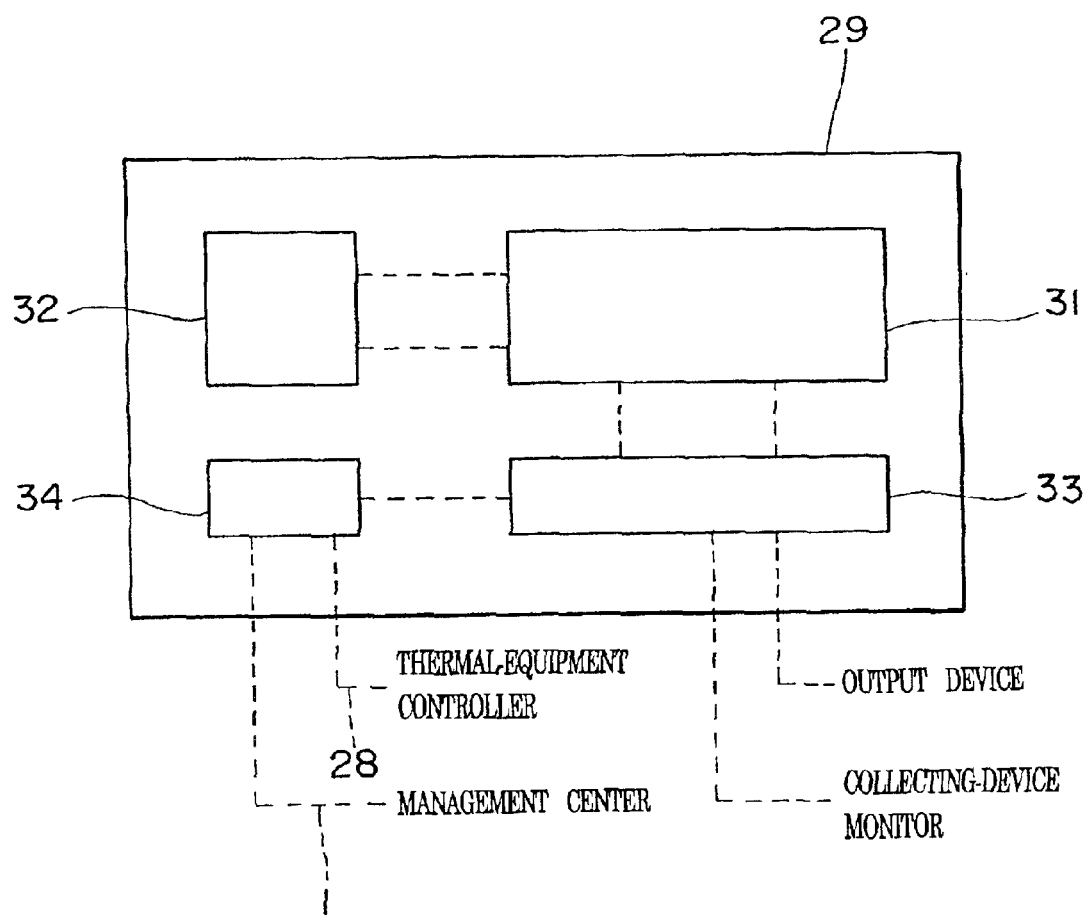
FIG. 3 is a block diagram showing the construction of an operating-state information collecting device.
Figure 4:
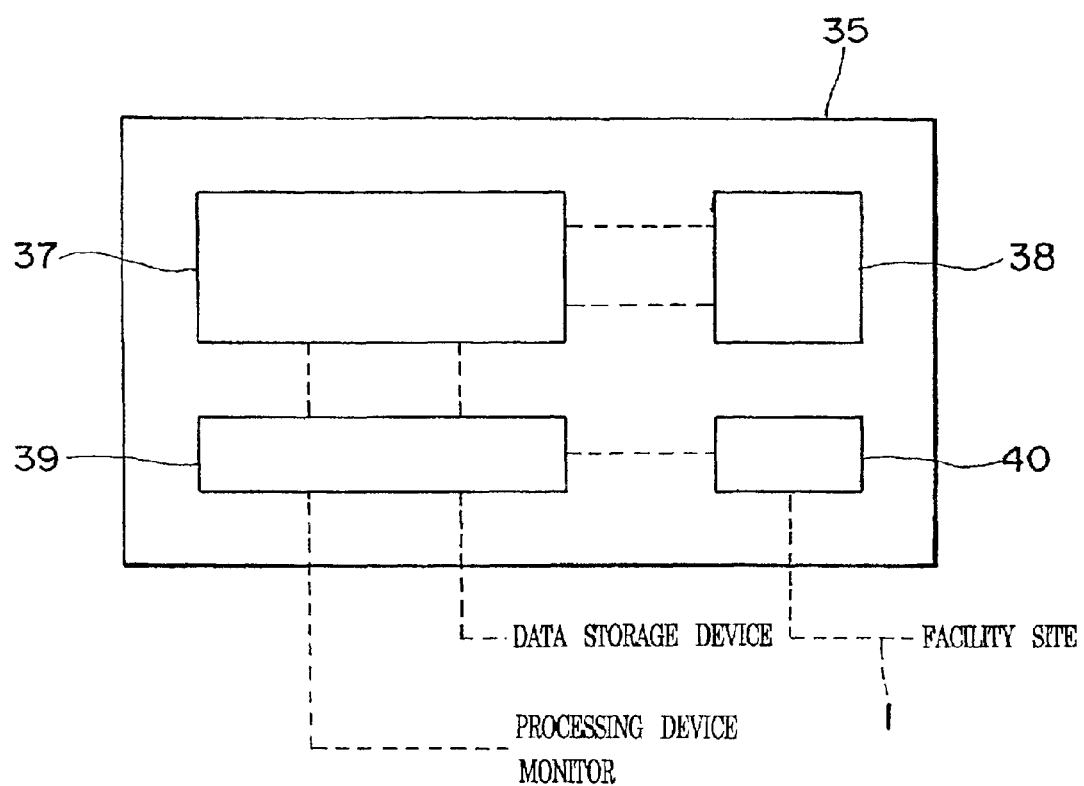
FIG. 4 is a block diagram showing the construction of an information processing device.
Figure 5:
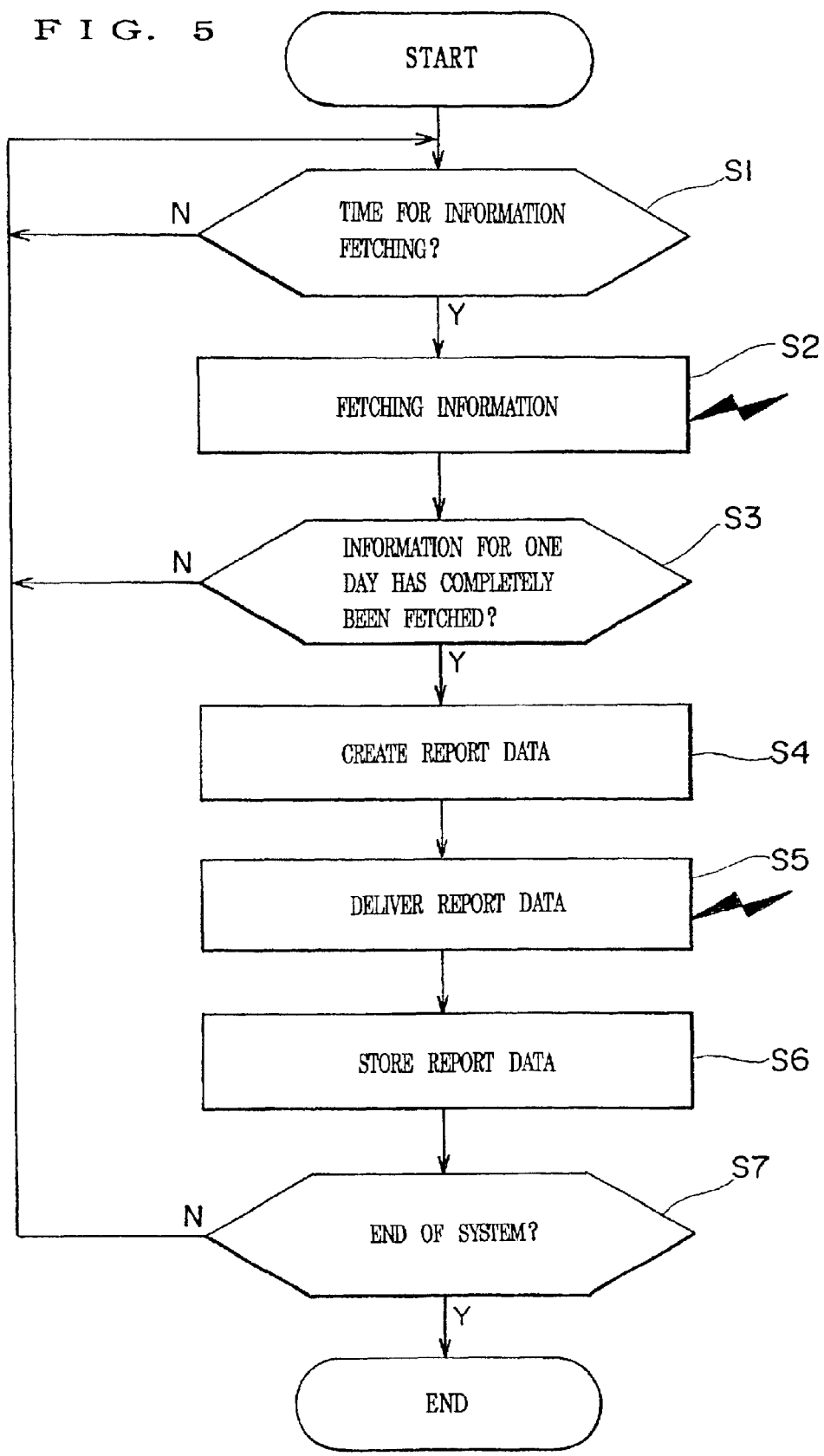
FIG. 5 is a flowchart showing the operation of the information processing device.
Figure 6:
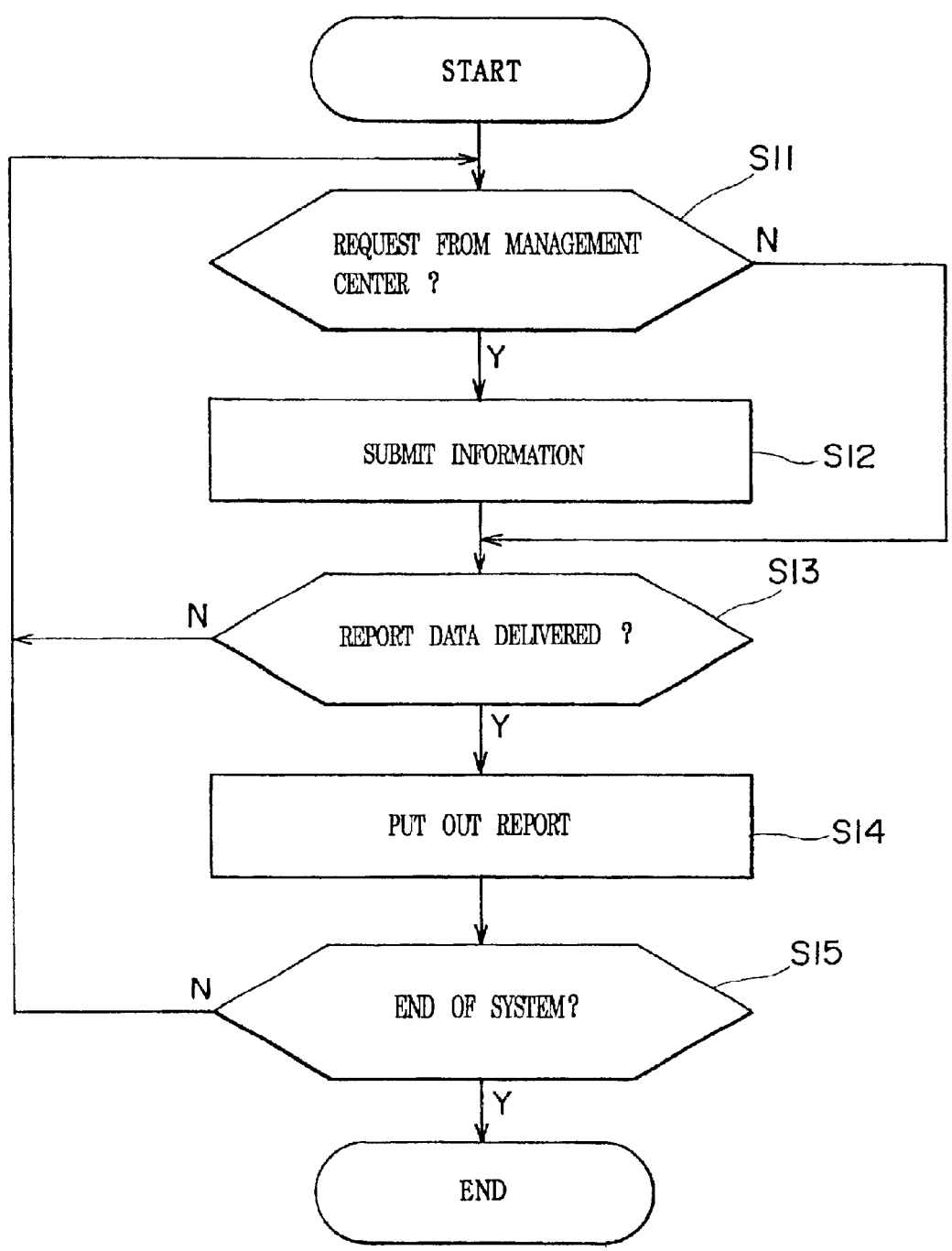
FIG. 6 is a flowchart showing the operation of the operating-state information collecting device.

FIG. 2 is a configurational diagram showing one embodiment of the system for inspecting thermal equipment according to the invention. The inspection is herein described as a system for performing periodical autonomous inspections. FIG. 3 is a block diagram showing the construction of an operating-state information collecting device, FIG. 4 is a block diagram showing the construction of an information processing device, FIG. 5 is a flowchart showing the operation of the information processing device, and FIG. 6 is a flowchart showing the operation of the operating-state information collecting device.

In FIG. 2, reference numeral 8 denotes a boiler as thermal equipment to be provided at a facility site 9. At the facility site 9 equipped with the boiler 8, a thermal-equipment controller 10, an operating-state information collecting device 2 and an output device 6 are provided in addition to the boiler 8. Further, the facility site 9 is connected to a management center 11 via a communication line 1, and an information processing device 4 and a data storage device 7 are provided at the management center 11.

It is assumed that the facility site 9 is under a specified contract on the boiler 8 (e.g., a contract related to maintenance and management of the boiler 8) with the management center 11. It is also assumed that the communication line 1 and a later-described communication line 28 may be either wired (public line or exclusive line) or wireless. It is further assumed that the management center 11 is connected to a singularity or plurality of facility site(s) 9 via the communication line 1.

First, each member of the above construction is described in detail.

The boiler 8 is comprised of a burner 12, a feed water line 13, a steam line 14, water-level detecting means 15 and steam-pressure detecting means 16. A fuel feed line 17 is connected to the burner 12. Also, the burner 12 is provided with a blower 19 via a window box 18. The fuel feed line 17 is provided with a fuel valve 20, and the window box 18 is provided with flame detecting means 21 for detecting flame state, i.e. combustion state, of the burner 12.

Meanwhile, the feed water line 13 has a feed water pump 22 connected to a lower portion of the boiler 8. The steam line 14, on the other hand, is connected to an upper portion of the boiler 8. Further, the water-level detecting means 15 is enabled to detect the water level in the boiler body, and the steam-pressure detecting means 16 is enabled to detect the steam pressure in the boiler body.

The thermal-equipment controller 10, which is a device for automatically controlling the boiler 8 (the device having a function of a microcomputer), is provided in the boiler 8 and comprised of a controller operating section 23, a controller storage section 24, a controller interface 25 and a controller modem 26. Also, the thermal-equipment controller 10 is controlled by the operating-state information collecting device 2. In addition, on occurrence of an abnormality to the boiler 8, a signal or the like showing the abnormality is transferred to the operating-state information collecting device 2. It is assumed that when the boiler 8 is provided one in number, the thermal-equipment controller 10 may be made to function as the operating-state information collecting device 2.

The controller operating section 23, having a function of a CPU (central processing unit) for microcomputers, operates in compliance with control programs previously stored in the controller storage section 24. The controller storage section 24 and the controller interface 25 are connected to the controller operating section 23.

The controller storage section 24, having the functions of ROM (read only memory), RAM (read/write memory) and EEPROM (electrically erasable and programmable ROM) for microcomputers, has stored therein control programs, fixed data, set value information, and the like. Further, the controller storage section 24 has a data area for storing therein various types of data to be used in the processing by the controller operating section 23, a work area for use in the processing, and the like.

The controller modem 26 is connected to the controller interface 25. Also, the water-level detecting means 15, the steam-pressure detecting means 16, the blower 19, the fuel valve 20, the flame detecting means 21 and the feed water pump 22 are connected to the controller interface 25 via a plurality of lines 27. Operating states of the boiler 8 are fetched successively into the controller operating section 23 via the controller interface 25.

The controller modem 26 is connected to the operating-state information collecting device 2 via the communication line 28. In this embodiment, the controller modem 26 is assumed to be a known modem.

The operating-state information collecting device 2, which is a device that controls and monitors the singularity or plurality of boiler(s) 8 and that collects information as to the operating states of the singularity or plurality of boiler(s) 8, is comprised of a collecting device body 29, a collecting-device monitor 30 (a display that allows the person in charge of equipment or a boiler operator at the facility site 9 to check the operating state or the like of the boiler 8). Also, the output device 6 is connected to the operating-state information collecting device 2. In addition, it is assumed that the operating-state information collecting device 2 may be implemented by using, for example, a personal portable computer.

The collecting device body 29, as shown in FIG. 3 (see also FIG. 2), is comprised of a collecting-device operating section 31, a collecting-device storage section 32, a collecting-device interface 33 and a collecting-device modem 34. The collecting-device storage section 32 and the collecting-device interface 33 are connected to the collecting-device operating section 31, while the output device 6, the collecting-device monitor 30 and the collecting-device modem 34 are connected to the collecting-device interface 33. Further, the communication lines 1, 28 are connected to the collecting-device modem 34. The operating-state information collecting device 2 is connected to each of the management center 11 and the thermal-equipment controller 10 via the two communication lines 1, 28. It is noted that the collecting-device modem 34 is assumed to be a known modem in this embodiment. Further, the collecting device body 29 is assumed to be able to receive e-mails.

The collecting-device operating section 31 has a function of a CPU for microcomputers as the controller operating section 23 of the thermal-equipment controller 10 does. Further, the collecting-device operating section 31 operates in compliance with control programs previously stored in the collecting-device storage section 32.

The collecting-device storage section 32 has functions of ROM, RAM and EEPROM for microcomputers as the controller storage section 24 of the thermal-equipment controller 10 does. Also, the collecting-device storage section 32 has stored therein control programs, fixed data, set value information, and the like. The collecting-device storage section 32 also has a data area for storing therein various types of data (e.g., collected information data related to the operating states of the boiler 8) to be used in the processing by the collecting-device operating section 31, a work area for use in the processing, and the like.

Reverting to FIG. 2, the output device 6 can be exemplified by a printer. The output device 6 is enabled, for example, to print out the contents of an e-mail received by the operating-state information collecting device 2. In addition, the person in charge of equipment or boiler operator at the facility site 9 is assumed to preserve and manage the printouts (daily reports and monthly reports).

The information processing device 4 is a device which controls and monitors the singularity or plurality of operating-state information collecting device(s) 2 and which further takes in the information (information data) related to the operating state to create report data or total report data for use of inspection recording related to the periodical autonomous inspections of the boiler 8 and to deliver the created report data or total report data to the facility site 9. The information processing device 4 is comprised of a processing device body 35 and a processing device monitor 36 (i.e., a display device that allows the checking of the contents of the report data or total report data (reports or total reports) delivered by the person in charge at the management center 11). In addition, it is assumed that the information processing device 4 can be implemented by using a personal portable computer, for example.

The processing device body 35, as shown in FIG. 4 (see also FIG. 2), is comprised of a processing-device operating section 37, a processing-device storage section 38, a processing-device interface 39 and a processing-device modem 40. The processing-device storage section 38 and the processing-device interface 39 are connected to the processing-device operating section 37, while the data storage device 7, the processing device monitor 36 and the processing-device modem 40 are connected to the processing-device interface 39 (where a keyboard and the like are also included, although not shown). Further, the communication line 1 is connected to the processing-device modem 40. In this embodiment, the processing-device modem 40 is assumed to be a known modem. Also, the processing device body 35 is assumed to be able to transmit e-mails.

The processing-device operating section 37 has a function of a CPU for microcomputers as the collecting-device operating section 31 of the operating-state information collecting device 2 does. Further, the processing-device operating section 37 operates in compliance with control programs previously stored in the processing-device storage section 38. In addition, the processing-device operating section 37 is assumed to have an unshown timer.

The processing-device storage section 38 has functions of ROM, RAM and EEPROM for microcomputers as the collecting-device storage section 32 of the operating-state information collecting device 2 does. Also, the processing-device storage section 38 has stored therein control programs, fixed data, set value information (e.g., fetch time and fetch-time interval for information data related to the operating state of the boiler 8) and the like. Further, the processing-device storage section 38 has a data area for storing therein various types of data (e.g., fetched information data related to the operating states of the boiler 8) to be used in the processing by the processing-device operating section 37, a work area for use in the processing, and the like.

The data storage device 7 is a database, into which report data created by the information processing device 4 is to be stored at each time of creation of those data. Also, the report data stored in the processing-device operating section 37 can be drawn out as required. In addition, it is assumed that the data storage device 7 has a storage area that allows report data of at least one month to be stored therein, and that the processing-device storage section 38 may substitute for the data storage device 7.

Next, how the processing-device operating section 37 of the information processing device 4 operates is described in outline with reference to FIG. 5. FIG. 2 is also here referred to as required. It is noted that the following description of outlined operation (outlined operation by referring to FIGS. 5 and 6) substitutes for the description of the inspection method of the present invention.

At step S1, it is decided whether or not it is the time when information (information data) related to the operating state of the boiler 8 is to be fetched. This decision is to be done based on the unshown timer of the processing-device operating section 37 and the set value information or the like stored in the processing-device storage section 38 (e.g., fetching is started at a specified time point, or fetching is done at a specified time interval). When it is not the time for the fetching of information (N at step S1), the operation keeps on standby until the fetching time. On the other hand, when it is the time for fetching (Y at step S1), the program moves to step S2.

After the move of processing to step S2, at the step S2, a telephone call is automatically made to the operating-state information collecting device 2 of the facility site 9, making the management center 11 and the facility site 9 connected to each other via the communication line 1, and further the fetching of the information (information data) collected by the operating-state information collecting device 2 is started. Then, the information (information data) fetched into the information processing device 4 is stored into the processing-device storage section 38. Thus, the fetching of the information (information data) at the fetch time is completed, and the program moves to processing of step S3. In addition, it is assumed that in event of any abnormality at the boiler 8, abnormality information (abnormality information data) is fetched in the same way as the information (information data) is done each time it occurs, irrespectively of the aforementioned time.

After the move of processing to the step S3, at the step S3, it is decided whether or not the information (information data) of one day has completely been fetched. That is, if the fetching of the information (information data) is done periodically, for example, two to three times (or at all times) a day (Y at step S3), the program moves to the processing of step S4. On the other hand, in the other case (N at step S3), the program moves to processing of step S1.

After the move of processing to step S4, at the step S4, the information (information data) and the abnormality information (abnormality information data) are subjected to arithmetic operation (e.g., efficiency calculation), and report data for use of inspection recording related to the periodical autonomous inspection is created in such a fashion that data is described into a specified format. The report data is data that becomes daily reports when printed out by the output device 6 of the facility site 9. Over the creation of the report data, the program moves to the processing of step S5.

After the move of processing to step S5, at the step S5, the created report data is delivered to the operating-state information collecting device 2 of the facility site 9 (delivered by e-mail in this embodiment), and the program moves to the processing of step S6. In addition, it is preferable for the person in charge at the management center 11 to check the contents of the data with the processing device monitor 36 before the delivery of the created report data to the operating-state information collecting device 2 of the facility site 9.

After the move of processing to step S6, at the step S6, the created report data is stored into a specified area of the data storage device 7, and the program moves to the processing of step S7.

It is noted here that although not shown in the flowchart in particular, daily report data stored and accumulated in the data storage device 7 is drawn out from the data storage device 7 when it is decided by the processing-device operating section 37 that, for example, data of one month has been stored, and then the data is subjected to arithmetic operations such as totaling and averaging. Thus, total report data for a specified period is created. The total report data is data that becomes monthly reports when printed out by the output device 6 of the facility site 9. The total report data is delivered to the operating-state information collecting device 2 of the facility site 9.

After the move of processing to step S7, at the step S7, if the system is halted or ended (Y at step S7), the sequence of processing is ended. Otherwise (N at step S7), the program returns to the processing of step S1 again, where it is decided whether or not it is the time when information (information data) related to the operating state of the boiler 8 is to be fetched.

Next, how the collecting-device operating section 31 of the operating-state information collecting device 2 operates is described in outline with reference to FIG. 6. FIG. 2 is also here referred to as required.

At step S11, it is decided whether or not there is a request for fetching of the information (information data) from the information processing device 4 of the management center 11. If there is such a request (Y at step S11), the program moves to the processing of step S12. On the other hand, conversely, if there is not such a request (N at step S11), the program moves to the processing of step S13.

After the move of processing to step S12, at the step S12, the information (information data) requested via the communication line 1 is transmitted to the information processing device 4, and the program moves to processing of step S13.

After the move of processing to the step S13, at the step S13, it is decided whether or not there is a delivery of report data (or total report data) from the information processing device 4. If there is such a delivery (Y at step S13), the program moves to the processing of step S14. On the other hand, conversely, if there is not such a delivery (N at step S13), the program returns to the processing of step S11 again, where it is decided whether or not there is a request for fetching of the information (information data) from the information processing device 4.

After the move of processing to step S14, at the step S14, daily reports are printed out by the output device 6 based on the delivered report data (or total report data). Then, the program moves to the processing of step S15.

After the move of processing to step S15, at the step S15, if the system is halted or ended (Y at step S15), the sequence of processing is ended. Otherwise (N at step S15), the program returns to the processing of step S11 again, where it is decided whether or not there is a request for fetching of the information (information data) from the information processing device 4.

As described above, according to the present invention, reports (daily reports and monthly reports) related to the periodical autonomous inspection of thermal equipment (the boiler 8 in this embodiment) can be automatically prepared. As a result of this, the person in charge of equipment or boiler operator can be largely reduced in labor, compared with that required conventionally. Also, the reports (daily reports and monthly reports) can be prepared by fetching information at more accurate time than when the person in charge of equipment or boiler operator prepares the reports (daily reports and monthly reports) (for example, reports can be prepared by fetching information accurately at accurate time intervals). Further, since reports (daily reports and monthly reports) are prepared in electronic data, use of the electronic data gives merits of possibilities of other uses. In addition, it is needless to say that various changes and modifications may be made on the embodiment of the present invention without departing from the spirit of the invention.

In conclusion, the method and system for inspecting thermal equipment according to the present invention can be summarized as follows:

1) A method for inspecting thermal equipment, comprising the steps of: fetching information related to operating state of thermal equipment via a communication line into an information processing device provided at a management center connected via the communication line to a facility site which is equipped with the thermal equipment and which is under a specified contract for the thermal equipment; making the information processing device execute creation of report data for use of inspection recording related to an inspection of the thermal equipment as well as delivery of the created report data to the facility site; and outputting from an output device a report based on the report data delivered from the information processing device at the facility site.

2) The method for inspecting thermal equipment as described in paragraph 1), wherein
the information related to operating state of the thermal equipment is fetched into the information processing device at a specified time point.

3) The method for inspecting thermal equipment as described in paragraph 2), wherein
the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

4) The method for inspecting thermal equipment as described in paragraph 2), wherein
in event of occurrence of an abnormality of the thermal equipment, abnormality information on the thermal equipment is fetched into the information processing device, and the fetched abnormality information is included in the report data.

5) The method for inspecting thermal equipment as described in paragraph 4), wherein
the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

6) The method for inspecting thermal equipment as described in paragraph 1), wherein the information related to operating state of the thermal equipment is fetched into the information processing device at a specified time interval.

7) The method for inspecting thermal equipment as described in paragraph 6), wherein the report data is stored in the data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

8) The method for inspecting thermal equipment as described in paragraph 6), wherein in event of occurrence of an abnormality of the thermal equipment, abnormality information on the thermal equipment is fetched into the information processing device, and the fetched abnormality information is included in the report data.

9) The method for inspecting thermal equipment as described in paragraph 8), wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

10) The method for inspecting thermal equipment as described in paragraph 1), wherein in event of occurrence of an abnormality of the thermal equipment, abnormality information on the thermal equipment is fetched into the information processing device, and the fetched abnormality information is included in the report data.

11) The method for inspecting thermal equipment as described in paragraph 10), wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

12) The method for inspecting thermal equipment as described in paragraph 1), wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

13) A system for inspecting thermal equipment to be built between a facility site which is equipped with thermal equipment and which is under a specified contract for the thermal equipment, and a management center which serves for maintenance and management of the thermal equipment, the system comprising:

a communication line for connecting the facility site and the management center to each other; an operating-state information collecting device provided at the facility site and serving for collecting information related to operating state of the thermal equipment; a facility-side modem interposed between the operating-state information collecting device and the communication line; an information processing device which is provided at the management center and which fetches the information related to operating state of the thermal equipment via the communication line and further which executes creation of report data for use of inspection recording related to an inspection of the thermal equipment as well as delivery of the created report data to the facility site; a center-side modem interposed between the information processing device and the communication line; and an output device which is provided at the facility site and which serves for outputting a report based on the delivered report data.

14) The system for inspecting thermal equipment as described in paragraph 13), wherein the system further comprises a data storage device for storing therein the report data at each time of creation of the report data, and wherein the information processing device is capable of executing creation of total report data for a specified period at which the report data stored in the data storage device is to be totaled as well as delivery of the created total report data to the facility site, while at the facility site, the output device is capable of outputting a total report of the specified period based on the total report data delivered from the information processing device.

15) The system for inspecting thermal equipment as described in paragraph 13), wherein in event of occurrence of an abnormality of the thermal equipment, the information processing device is capable of fetching abnormality information on the thermal equipment and making the fetched abnormality information included in the report data.

16) The system for inspecting thermal equipment as described in paragraph 15), wherein the system further comprises a data storage device for storing therein the report data at each time of creation of the report data, and wherein the information processing device is capable of executing creation of total report data for a specified period at which the report data stored in the data storage device is to be totaled as well as delivery of the created total report data to the facility site, while at the facility site, the output device is capable of outputting a total report of the specified period based on the total report data delivered from the information processing device.

As described hereinabove, according to the first aspect of the present invention, a report related to the inspection of thermal equipment can be prepared automatically. Thus, there can be provided a thermal-equipment inspection method which allows a reduction in labor.

According to the second aspect of the invention, in addition to the effects of the first aspect, there can be produced an effect that information fetching can be achieved more accurately than persons do.

According to the third aspect of the invention, in addition to the effects of the first aspect, there can be produced an effect that information fetching can be achieved more accurately than persons do.

According to the fourth aspect of the invention, in addition to the effects of either the first or third aspect, there can be produced an effect that a report in which abnormality information is additionally described can be prepared automatically.

According to the fifth aspect of the invention, in addition to the effects of either the first or fourth aspect, there can be produced an effect that a total report of a specified period related to the inspection of thermal equipment can be prepared automatically.

According to the sixth aspect of the invention, a report related to the inspection of thermal equipment can be prepared automatically. Thus, there can be provided a thermal-equipment inspection system which allows a reduction in labor.

According to the seventh aspect of the invention, in addition to the effects of the sixth aspect, there can be produced an effect that a report in which abnormality information is additionally described can be prepared automatically.

According to the eighth aspect of the invention, in addition to the effects of either the sixth or seventh aspect, there can be produced an effect that a total report of a specified period related to the inspection of thermal equipment can be prepared automatically.

What is claimed is:

1. A method for inspecting thermal equipment, comprising the steps of:
   fetching information related to an operating state of thermal equipment via a communication line into an information processing device provided at a management center connected via the communication line to a facility site which is equipped with the thermal equipment and which is under a specified contract for the thermal equipment;
   making the information processing device execute creation of report data for use of inspection recording related to an inspection of the thermal equipment as well as delivery of the created report data to the facility site; and
   outputting from an output device a report based on the report data delivered from the information processing device at the facility site.

2. The method for inspecting thermal equipment according to claim 1, wherein said step of fetching the information related to the operating state of the thermal equipment occurs at a specified time point.

3. The method for inspecting thermal equipment according to claim 2, further comprising the steps of:
   storing the report data in a data storage device at each time during a creation of the report data,
   executing by the information processing device a creation of a total report data for the specified period at which the stored report data is to be totaled as well as delivery of the created total report data to the facility site, and
   outputting, while at the facility site, a total report of the specified period based on the total report data delivered from the information processing device from the output device.

4. The method for inspecting thermal equipment according to claim 2, wherein in event of occurrence of an abnormality of the thermal equipment, abnormality information on the thermal equipment is fetched into the information processing device, and the fetched abnormality information is included in the report data.

5. The method for inspecting thermal equipment according to claim 4, further comprising the steps of:
   storing the report data in a data storage device each time the report data is created, and
   executing by the information processing device a creation of a total report data for & the specified period at which the stored report data is to be totaled as well as delivery of the created total report data to the facility site, and
   outputting, while at the facility site, a total report of the specified period based on the total report data delivered from the information processing device from the output device.

6. The method for inspecting thermal equipment according to claim 1, wherein the information related to operating state of the thermal equipment is fetched into the information processing device at a specified time interval.

7. The method for inspecting thermal equipment according to claim 6, wherein the report data is stored in the data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

8. The method for inspecting thermal equipment according to claim 6, wherein in event of occurrence of an abnormality of the thermal equipment, abnormality information on the thermal equipment is fetched into the information processing device, and the fetched abnormality information is included in the report data.

9. The method for inspecting thermal equipment according to claim 8, wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

10. The method for inspecting thermal equipment according to claim 1, wherein in event of occurrence of an abnormality of the thermal equipment, abnormality information on the thermal equipment is fetched into the information processing device, and the fetched abnormality information is included in the report data.

11. The method for inspecting thermal equipment according to claim 10, wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

12. The method for inspecting thermal equipment according to claim 1, wherein the report data is stored in a data storage device at each time of creation of the report data, and the information processing device executes creation of total report data for a specified period at which the stored report data is to be totaled as well as delivery of the created total report data to the facility site, while at the facility site, a total report of the specified period based on the total report data delivered from the information processing device is outputted from the output device.

13. A system for substantially reducing personnel and human error during required periodic inspections of thermal equipment, said system to be built between a facility site, equipped with the thermal equipment under a specified contract for the thermal equipment, and a management center which serves for maintenance and management of the thermal equipment, the system comprising:

a communication line for connecting the facility site and the management center to each other;

an operating-state information collecting device, provided at the facility site, for collecting information related to operating states of the thermal equipment;

a facility-side modem interposed between the operating-state information collecting device and the communication line;

an information processing device provided at the management center and for fetching the information related to the operating states of the thermal equipment via the communication line and for executing a creation of report data for inspection recording, the inspection recording related to an inspection of the thermal equipment as well as delivery of the created report data to the facility site;

a management center-side modem interposed between the information processing device and the communication line; and an output device provided at the facility site for outputting a report based on the delivered report data.

14. The system for inspecting thermal equipment according to claim 13, further comprising a data storage device for storing therein the report data each time the report data has been created, and wherein the information processing device being capable of executing creation of total report data for a specified period at which the report data stored in the data storage device is to be totaled as well as delivery of the created total report data to the facility site, while at the facility site, the output device outputting a total report of the specified period based on the total report data delivered from the information processing device.

15. The system for inspecting thermal equipment according to claim 13, wherein in event of occurrence of an abnormality of the thermal equipment, the information processing device is capable of fetching abnormality information on the thermal equipment and making the fetched abnormality information included in the report data.

16. The system for inspecting thermal equipment according to claim 15, further comprising a data storage device for storing therein the report data each time during creation of the report data, and wherein the information processing device is capable of executing creation of total report data for a specified period at which the report data stored in the data storage device is to be totaled as well as delivery of the created total report data to the facility site, while at the facility site, the output device is capable of outputting a total report of the specified period based on the total report data delivered from the information processing device.

* * * * *